May 3, 1949. W. G. WHITE 2,469,023
PIVOTAL STAKE AND LATCH THEREFOR
Filed May 28, 1948 2 Sheets-Sheet 2
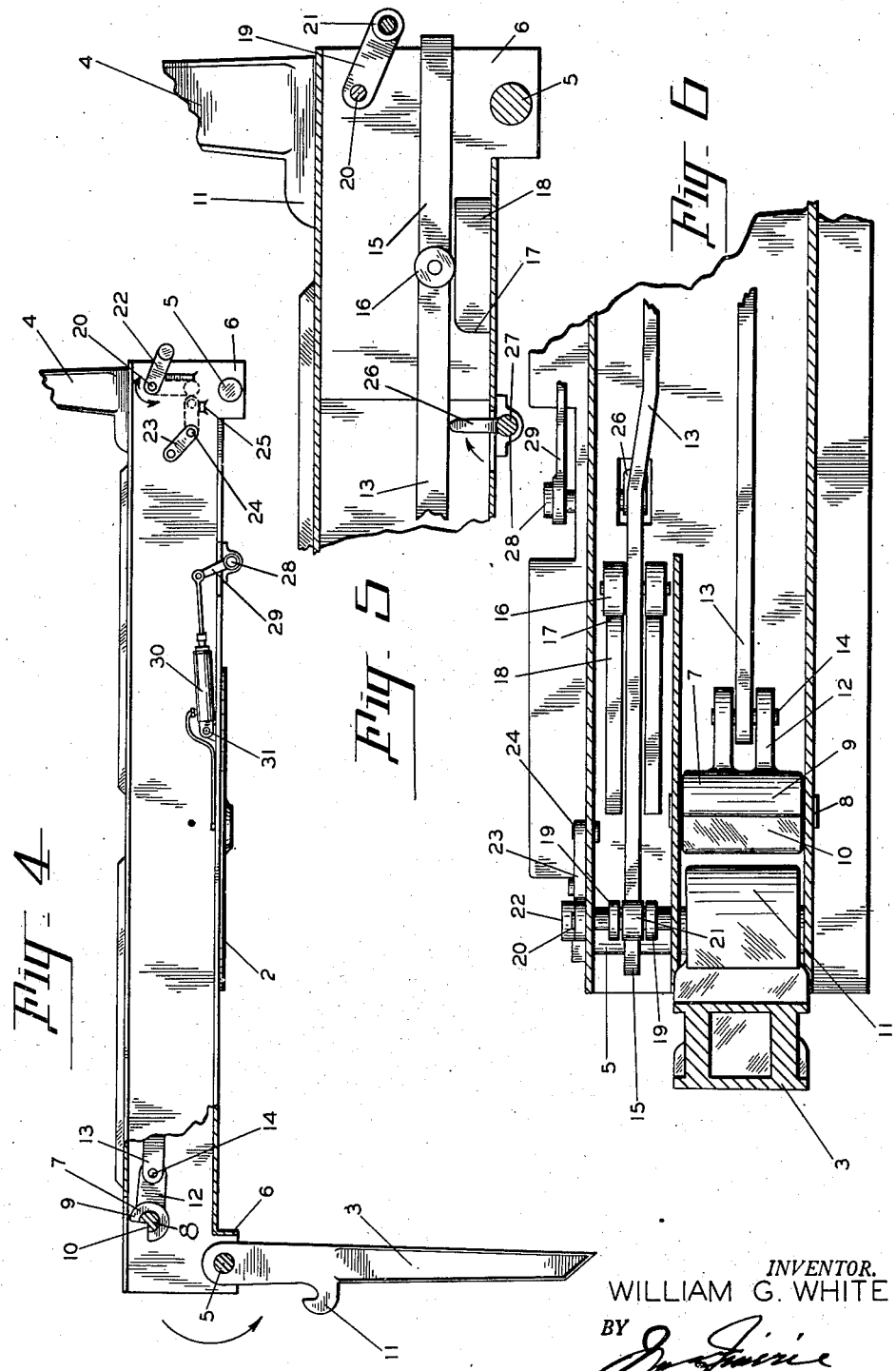
INVENTOR.
WILLIAM G. WHITE
BY
ATTORNEY Patented May 3, 1949

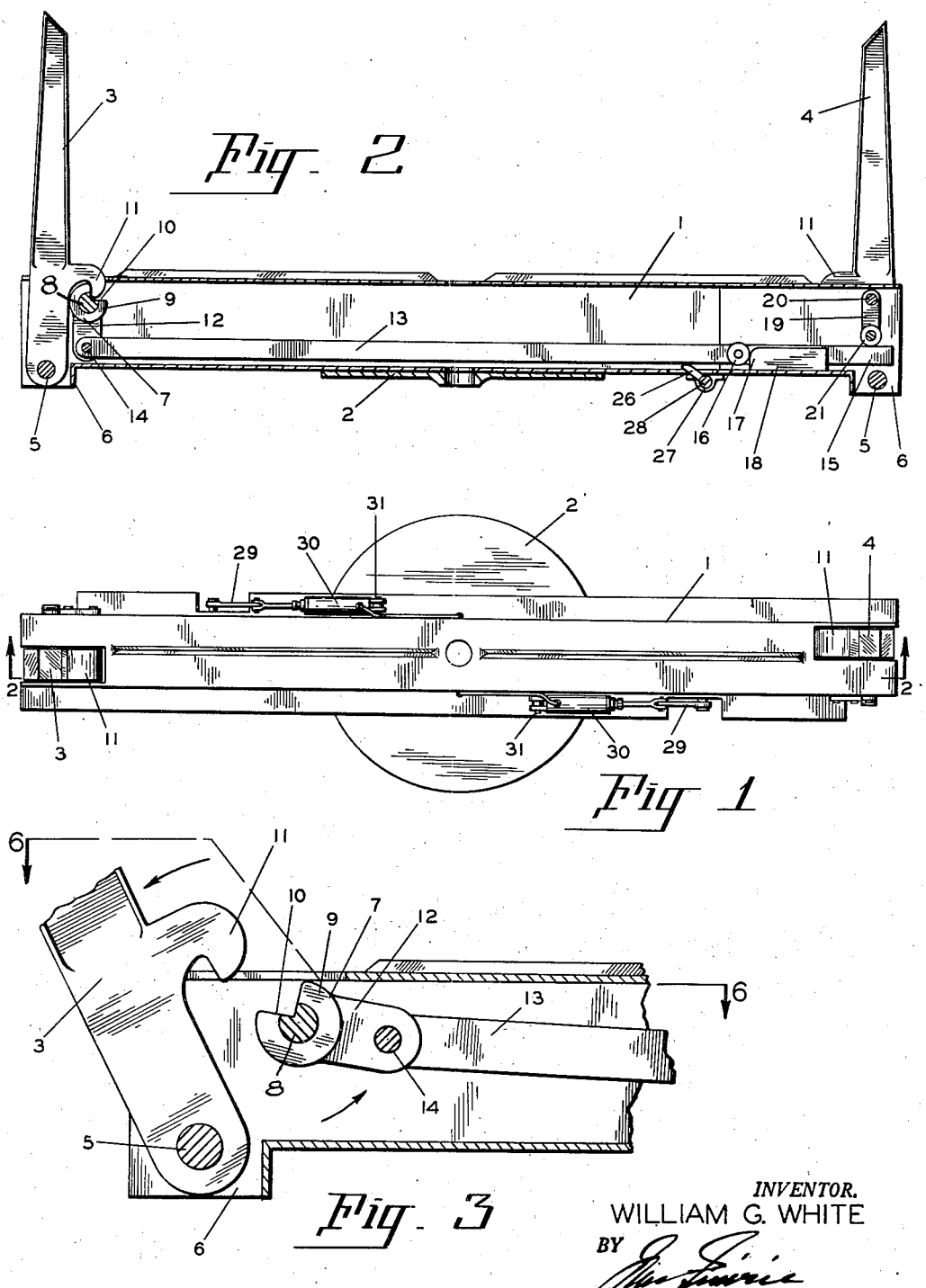

2,469,023

UNITED STATES PATENT OFFICE 2,469,023

PIVOTAL STAKE AND LATCH THEREFOR

William G. White, Aberdeen, Wash.

Application May 28, 1948, Serial No. 29,800

4 Claims. (Cl. 280—145)

My invention relates to improvement in stake bunks and is particularly adapted for trucks and trailers used for hauling logs. This application is an improvement over my pending application Serial No. 786,406, filed Nov. 17, 1947.

With my new and improved stake bunk, the stakes are held in a vertical position for the hauling of logs and the like by a very reliable locking means resisting a maximum of pressure exerted by the expansion of the load between the stakes, also this locking means is of such a principle as to be very easily released either by hand or by mechanical operation.

In the unlocking of the mechanism for holding the stakes, the same may be done with safety as the operator releasing the stakes must be on the opposite side of the load from the stakes being released or tripped.

With my new and improved stake bunk construction, once the stake is locked in upright position for holding the load on the bunk the stakes will have to be definitely unlocked before they will dump the load from the bunk.

The principal object of the invention is the provision of stakes in bunks having a locking mechanism of such a principle as to provide for the greatest amount of leverage in the holding of the stake in a vertical position.

Another object of the invention is the provision of a holding and locking mechanism that can be easily tripped or unlocked requiring a minimum amount of power in doing so.

A still further object of my invention is the providing of a positive locking means for preventing the stake from being released.

And a still further object of the invention is the fact that the releasing of the stake has to be performed from the opposite side of the load being dumped, thereby insuring greater safety in the dumping of the logs from trucks and trailers.

These and other incidental objects will be apparent in the drawings, specification and claims.

Referring to the drawings:

Figure 1 is a plan view of my new and improved stake bunk removed from either the truck or the trailer.

Figure 2 is a side sectional view taken on line 2—2 of Figure 1 looking in the direction indicated, illustrating the stakes in upright position together with the locking and holding means associated therewith.

Figure 3 is a detailed sectional fragmentary view of the bunk illustrating the stake being released from its holding or locking means.

Figure 4 illustrates the side view of a bunk having one of the stakes released, while the opposite stake is in vertical or locked position.

Figure 5 is an enlarged detail sectional view of the safety locking mechanism.

Figure 6 is an enlarged plan detail view taken on line 6—6 of Figure 3, illustrating the stake holding latch together with the locking mechanism of the oppositely disposed stake.

Referring more specifically to the drawings:

My new and improved stake bunk consists of a bunk 1 having the usual bolster plate 2 forming part thereof, adapting the same to the frame of the truck or trailer. In my new and improved bunk the stakes 3 and 4 are journalled to the cross shafts 5, which are mounted within the ends 6 of the bunk 1 by any suitable means.

A locking latch 7 is pivotally mounted within the bunk at 8 and consists of a hub or body member 9 having a notched out portion 10 adapted to receive the hook 11 forming part of the stakes 3 and 4. A crank arm 12 forms part of the hub or body member 9 and has a link or bar 13 pivotally mounted thereto by the cross pin 14. The opposite end 15 of the link or bar 13 has cam rollers 16 adapted to engage the end 17 of the cams 18, as illustrated in Figures 2 and 6 for holding the stake in the vertical position. The link or bar 13 is held in this position by the locking dog 19, which is keyed to the cross shaft 20 at its one end and having a roller 21 at its opposite end for engaging the upper surface of the end 15 of the link 13.

Referring to Figures 4 and 6, a hand operated lever 22 is also keyed to the cross shaft 20. When this lever is in the dotted position as indicated in Figure 4, the dog 19 will be in the position illustrated in Figures 2 and 6 holding the bar 13 down engaging the cam rollers 16 with the end 17 of the cam 18, thereby maintaining the notch 10 of the hub 9 of the stake locking mechanism in engagement with the hook 11 of the stake.

The manual locking lever 22 is held in the dotted position by the latch 23, which is pivotally mounted at 24 to the bunk and resting on the stop 25 against the lever 22 maintaining the dog 19 in the position illustrated in Figures 2 and 6 until the latch 23 is rotated to the position shown in these figures, at which time the dog 19 will take the position shown in Figure 5, permitting the bar 13 to be raised by the cam 26. The said cam is pivotally mounted to the bunk at 27. This cam is keyed to the shaft 28, the said shaft having a crank 29 also keyed thereto and adapted to be operated directly by hand or by the air cylinder 30, which is fixedly mounted to the bunk at 31.

When the cam 26 is operated raising the end 15 of the bar or link 13, the cam rollers 16 will be released from the end 17 of the cams 18 allowing the outward pressure exerted on the stakes causing the hook 11 to rotate the hub 9 and its locking latch 10 to the position illustrated in Figure 3, allowing the stake-to-drop to the position illustrated in Figure 4.

It will be noted that the notch 10 in the hub 9 is relatively close to the center of the hub. This transfers the pulling strain exerted by the hook 11 near the center of the cross pin 8 exerting a minimum amount of pressure on the link 13 while the load is being transported, thereby requiring a minimum of effort in the raising of the bar 13 for disengaging the cam rollers from the end of the cams 18.

From the above description it will be noted that the shaft 5 of the stake is located quite some distance from the locking hooks 9 of the stake holding lock giving a powerful resistance to the stake in the holding of the load on the bunk. The hook 9 exerts a pressure almost central of the cross shaft 8 of the locking hub permitting ease of operation of the lock assembly. The locking mechanism for holding the hub 9 in locked position is located at the opposite end of the bunk so that the operator of the same will be a safe distance and at the opposite side of the load being dumped in the releasing of the stake, thereby carrying out the objects of my invention.

What I claim is:

1. A stake bunk, comprising a bunk, a stake pivotally mounted on one end of said bunk, a hook extending laterally from said stake, a latch pivotally mounted on said bunk for cooperation with said hook to hold said stake at substantially right angles to said bunk, a crank fixed to said latch, a link pivotally connected to said crank and extending longitudinally of said bunk to the opposite end thereof, a cam roller journalled on said link, a cam fixed to said bunk for cooperation with said roller to hold said link in latch locking position, and a dog fixed to a manually operable lever and pivotally mounted on said bunk for cooperation with said link to lock said link in cam cooperating position.

2. A stake bunk comprising a bunk, a stake pivotally mounted on one end of said bunk, a hook extending laterally from said stake, a latch pivotally mounted on said bunk for cooperation with said hook to hold said stake at substantially right angles to said bunk, a crank fixed to said latch, a link pivotally connected to said crank and extending longitudinally of said bunk to the opposite end thereof, a cam roller journalled on said link, a cam fixed to said bunk for cooperation with said roller to hold said link in latch locking position, a dog fixed to a manually operable lever and pivotally mounted on said bunk for cooperation with said link to lock said link in cam cooperating position, and a latch lever pivotally mounted on said bunk for cooperation with said dog to retain said dog in link cooperating position.

3. A stake bunk comprising a bunk, a stake pivotally mounted on one end of said bunk, a hook extending laterally from said stake, a latch pivotally mounted on said bunk for cooperation with said hook to hold said stake at substantially right angles to said bunk, a crank fixed to said latch, a link pivotally connected to said crank and extending longitudinally of said bunk to the opposite end thereof, a cam roller journalled on said link, a cam fixed to said bunk for cooperation with said roller to hold said link in latch locking position, a dog fixed to a manually operable lever and pivotally mounted on said bunk for cooperation with said link to lock said link in cam cooperating position, a latch lever pivotally mounted on said bunk for cooperation with said dog to retain said dog in link cooperating position, a cam lever pivotally mounted on said bunk for lifting said link from cam locked position to release said stake, and a crank lever connected with said cam lever for its selective operation.

4. A stake bunk comprising a bunk, a stake pivotally mounted on one end and at the bottom of said bunk, a hook spaced from the pivotal mounting and extending laterally from said stake, a latch pivotally mounted at the top of said bunk for cooperation with said hook to hold said stake at substantially right angles to said bunk, a crank fixed to said latch, a link pivotally connected to said crank and extending longitudinally of said bunk to the opposite end thereof, a cam roller journalled on said link, a cam fixed to said bunk for cooperation with said roller to hold said link in latch locking position, a dog fixed to a manually operable lever and pivotally mounted on said bunk for cooperation with said link to lock said link in cam cooperating position, a latch lever pivotally mounted on said bunk for cooperation with said dog to retain said dog in link cooperating position, a cam lever pivotally mounted on said bunk for lifting said link from cam locked position to release said stake, and a crank lever connected with said cam lever for its selective operation.

WILLIAM G. WHITE.

REFERENCES CITED

The following references are of record in the file of this patent:

UNITED STATES PATENTS

| Number | Name | Date |
|---|---|---|
| 841,500 | Flynn | Jan. 15, 1907 |
| 2,256,623 | Newman, Sr. | Sept. 23, 1941 |